(12) United States Patent
Grange et al.

(10) Patent No.: US 10,545,734 B2
(45) Date of Patent: Jan. 28, 2020

(54) METHOD FOR DESIGNING A GRAPHICAL INTERFACE PROGRAM

(71) Applicant: Creative Information Technology, Lyons (FR)

(72) Inventors: Eric Grange, Lyons (FR); Philippe Rinaudo, Lyons (FR)

(73) Assignee: Creative Information Technology, Lyons (FR)

( * ) Notice: Subject to any disclaimer, the term of this patent is extended or adjusted under 35 U.S.C. 154(b) by 696 days.

(21) Appl. No.: 14/529,298

(22) Filed: Oct. 31, 2014

(65) Prior Publication Data

US 2015/0121259 A1 Apr. 30, 2015

Related U.S. Application Data

(63) Continuation of application No. 13/206,737, filed on Aug. 10, 2011, now abandoned, which is a continuation-in-part of application No. 12/046,304, filed on Mar. 11, 2008, now abandoned.

(51) Int. Cl.
| | | |
|---|---|---|
| *G06F 3/00* | (2006.01) | |
| *G06F 8/38* | (2018.01) | |
| *G06F 3/048* | (2013.01) | |
| *G06F 3/0484* | (2013.01) | |
| *G06F 3/0482* | (2013.01) | |

(52) U.S. Cl.
CPC ............... *G06F 8/38* (2013.01); *G06F 3/048* (2013.01); *G06F 3/0482* (2013.01); *G06F 3/0484* (2013.01); *G06F 3/04842* (2013.01)

(58) Field of Classification Search
CPC ...... G06F 3/048; G06F 3/0484; G06F 3/0482; G06F 3/04842
See application file for complete search history.

(56) References Cited

U.S. PATENT DOCUMENTS

| | | | |
|---|---|---|---|
| 4,722,406 A | 2/1988 | Naito | |
| 4,813,013 A | 3/1989 | Dunn | |
| 5,163,130 A | 11/1992 | Hullot | |
| 5,189,608 A * | 2/1993 | Lyons | ............ G06F 17/246 |
| | | | 705/30 |
| 5,261,043 A | 11/1993 | Wolber et al. | |

(Continued)

OTHER PUBLICATIONS

Maso, B., *The Visual J++ Handbook,* instruction guide 1997, printed in the United States of America by Osborne McGraw-Hill. pp. 132, 139.

*Primary Examiner* — Kieu D Vu
*Assistant Examiner* — Andrew Chung
(74) *Attorney, Agent, or Firm* — Wolf, Greenfield & Sacks, P.C.

(57) ABSTRACT

A computer implemented method of generating a graphical interface including receiving and displaying a selection of elements among a plurality of graphical and/or data entry elements, each element having at least a property among a plurality of graphical and/or activation and/or content properties; receiving and displaying formulas, each formula linking at least two properties of one element or several elements of the selection; and determining from the selection of elements and the formulas a separate graphical interface program, the execution of the separate graphical interface program resulting in the display of the selection of elements, the properties of which are linked by the formulas.

9 Claims, 4 Drawing Sheets

```
26A {  procedure TForm1.Choix2Click(Sender: TObject);
       begin
           Option1.Enabled:=Choix2.Checked;
           Option2.Enabled:=Choix2.Checked;
       end;

26B {  procedure TForm1.Option1Click(Sender: TObject);
       begin
           EditOption1.Enabled:=Option1.Checked and Choix2.Checked;
       end;

26C {  procedure TForm1.EditOption1Change(Sender: TObject);
       var
           sum : Float;
       begin
           sum:=0;
           if Option1.Checked then
               sum:=sum+EditOption1.Value;
           if Option2.Checked then
               sum:=sum+EditOption2.Value;
           Amount.Text:=Format('%.3f, [sum]);
       end;
```

(56) References Cited

U.S. PATENT DOCUMENTS

| | | | |
|---|---|---|---|
| 5,469,538 A * | 11/1995 | Razdow | G06F 17/215 345/440 |
| 5,524,246 A | 6/1996 | Hurley et al. | |
| 5,537,630 A | 7/1996 | Berry et al. | |
| 5,574,918 A | 11/1996 | Hurley et al. | |
| 5,680,557 A * | 10/1997 | Karamchetty | G06F 8/34 715/765 |
| 5,760,788 A | 6/1998 | Chainini et al. | |
| 5,862,379 A | 1/1999 | Rubin et al. | |
| 5,933,637 A | 8/1999 | Hurley et al. | |
| 6,192,511 B1 | 2/2001 | Johnston et al. | |
| 6,199,199 B1 | 3/2001 | Johnston et al. | |
| 6,212,675 B1 | 4/2001 | Johnston et al. | |
| 6,243,726 B1 * | 6/2001 | Satoh | G06F 15/0225 708/520 |
| 6,282,699 B1 * | 8/2001 | Zhang | G06F 8/34 715/967 |
| 6,292,810 B1 * | 9/2001 | Richards | G06F 17/246 707/999.1 |
| 6,580,440 B1 | 6/2003 | Wagner et al. | |
| 6,912,428 B2 | 6/2005 | Nakai et al. | |
| 7,849,440 B1 | 12/2010 | Englehart | |
| 7,913,225 B2 | 3/2011 | Seemann et al. | |
| 8,136,043 B2 | 3/2012 | Naka | |
| 8,589,869 B2 * | 11/2013 | Wolfram | G06F 8/30 707/723 |
| 2002/0013779 A1 * | 1/2002 | Sridhar | G06F 17/30392 |
| 2003/0160822 A1 | 8/2003 | Belz et al. | |
| 2003/0221162 A1 * | 11/2003 | Sridhar | G06F 17/30398 715/229 |
| 2004/0153992 A1 | 8/2004 | Molina-Moreno et al. | |
| 2005/0066285 A1 | 3/2005 | Santori et al. | |
| 2006/0271908 A1 | 11/2006 | Bargh et al. | |
| 2007/0288283 A1 * | 12/2007 | Fitzpatrick | G06Q 10/06 705/7.17 |
| 2008/0056403 A1 | 3/2008 | Wilson | |
| 2008/0126973 A1 | 5/2008 | Kline | |
| 2008/0222539 A1 | 9/2008 | Konaka et al. | |
| 2009/0113399 A1 | 4/2009 | Tzoref et al. | |
| 2009/0235188 A1 | 9/2009 | Rinaudo et al. | |
| 2010/0070852 A1 * | 3/2010 | Li | G06F 17/3089 715/239 |
| 2010/0077331 A1 * | 3/2010 | Bargh | G06F 8/34 715/764 |
| 2010/0174554 A1 * | 7/2010 | Monson | G06Q 50/24 705/3 |
| 2011/0292438 A1 | 12/2011 | Inami et al. | |

\* cited by examiner

|  | A | B |
|---|---|---|
| 44A  1 | Option1.Enabled | =Choix2.Checked |
| 44B  2 | Option2.Enabled | =Choix2.Checked |
| 44C  3 | EditOption1.Enabled | =AND(Option1.Checked; Choix2.Checked) |
| 44D  4 | EditOption2.Enabled | =AND(Option2.Checked; Choix2.Checked) |
| 44E  5 | Amount.Text | =IF(EditOption1.Enabled; EditOption1.Value)<br>+IF(EditOption2.Enabled; EditOption2.Value) |

METHOD FOR DESIGNING A GRAPHICAL INTERFACE PROGRAM

CROSS REFERENCE TO RELATED APPLICATIONS

This application is a continuation of U.S. application Ser. No. 13/206,737, filed on Aug. 10, 2011 which is a continuation-in-part of U.S. application Ser. No. 12/046,304, filed on Mar. 11, 2008, entitled METHOD FOR DESIGNING A GRAPHICAL INTERFACE PROGRAM, the entire contents of each of which is incorporated herein by reference to the maximum extent allowable by law.

FIELD OF THE INVENTION

The present invention relates to a method for designing a graphical interface program.

BACKGROUND OF THE INVENTION

The use of computers has greatly facilitated operations such as the entry of data or the command of machines by providing user-friendly graphical interfaces that can be adapted to the needs of the user. Such interfaces are also called graphical user interface (GUI).

Specific programs, called graphical interface design programs, give a designer the possibility of designing a graphical interface by selecting graphics and/or interactive elements in a tool library. These elements correspond, for example, to check boxes, pull-down menus, boxes corresponding to work areas for entering data through a keyboard, etc. Properties associated with each element are selected by the designer. For example, a property of a check box is the fact that the box is checked or unchecked. A property of a data entry box is the value of data entered therein. Another property of a data entry box is the fact that data entry in the box is allowed (the box is said to be enabled) or that no data entry in the box is allowed (the box is said to be disabled).

Once the different elements of the graphical interface, and the associated properties, are selected, the graphical interface design program also gives the possibility to the designer of adding event programs that will be linked to the graphical interface. An event program is a program including a sequence of instructions that, when the property of an element has been changed, modifies the value of another property of the same element or the property of another element of the graphical interface. The event programs are commonly written by the designer using a programming language such as the visual basic. JAVA or a scripting language like JavaScript. Once the event programs are written, they can be converted into a computer executable form by a compiler. A graphical interface program is then obtained. When the graphical interface program is executed by a user on a computer, a graphical interface is displayed as configured by the designer. When the user enters new data, checks boxes, etc., properties of the elements of the graphical interface are modified according to the event programs associated with the graphical interface.

Such a method for designing a graphical interface has several drawbacks. First, as the event programs are written by the designer, the designer is required to have enough knowledge of the programming language accepted by the graphical interface design program. Moreover, the designer must think of all the event programs he wants to associate with the graphical interface since the graphical interface design program generally provides no help during the writing of the event programs. Moreover, it is up to the designer to search for the inconsistencies in event programs. An inconsistency corresponds, for example, to a never-ending loop which would occur when the graphical interface program is executed. Indeed, the compiler generally only provides a check of the syntax of the event programs but does not provide a complete check of a good execution of the event programs for all the possible values of the properties of the elements of the graphical interface.

SUMMARY OF THE INVENTION

It is an aim of embodiments of the present invention to at least partially address one or more problems in the prior art.

According to one aspect of the present invention, there is provided a computer implemented method of generating a graphical interface program comprising receiving and displaying a selection of elements or components among a plurality of graphical and/or data entry elements/components, each element/component having at least a property among a plurality of graphical and/or activation and/or content properties; receiving and displaying formulas, each formula being a referentially transparent expression linking at least two properties of one element or several elements of said selection; and determining from said selection of elements and said formulas a separate graphical interface program, the execution of said separate graphical interface program resulting in the display of said selection of elements, the properties of which are linked by said formulas, any input of a user modifying an element with linked properties resulting in a re-evaluation of the formula and a possible update of the display of the linked element.

The referential transparency of the formulas implies that the formulas are considered as mathematic formulas, as encountered in functional programming or spreadsheets, allows proving correctness, simplifying algorithms and optimizing code.

All the user interactions with the resulting program are defined in functional programming and not, as with most of event based computer languages, in imperative programming.

According to one embodiment of the present invention, the components can be placed in layers, the properties of which can be defined by formulas as the component properties. The layers can be partially transparent in order for the user to see components from multiple layers. More generally, a program defined with the components can be recursively used as a component itself, the properties of which will be defined by formulas referencing components properties or any data available.

According to one embodiment of the present invention, the method further comprises the steps of checking the formulas for inconsistencies, in particular circular references, before the determination of said separate graphical interface program and of displaying an alert message when at least one inconsistency is determined.

According to one embodiment of the present invention, the method further comprises the step of displaying an alert message when none of said formulas includes a first property among the plurality of graphics and/or activation and/or content properties.

According to one embodiment of the present invention, the method further comprises the step of displaying an alert message when a second property included in the formulas remains unchanged when the other properties of the formulas are modified.

According to one embodiment of the present invention, for at least one formula among said formulas, at least one property of the at least two properties of said at least one formula is representative of whether or not, during the execution of said graphical interface program, the element associated with said at least one property is allowed to be activated.

According to one embodiment of the present invention, for at least one formula among said formulas, at least one property of the at least two properties of said at least one formula is representative of whether or not, during the execution of said graphical interface program, the element associated with said at least one property was used.

According to one embodiment of the present invention, for at least one formula among said formulas, at least one property of the at least two properties of said at least one formula is representative of whether or not, during the execution of said graphical interface program, the element associated with said at least one property is displayed.

According to another aspect of the present invention, there is provided a general purpose data processor operating under the control of a stored program containing a set of instructions that, when executed, control the data processor to perform the following functions: receiving and displaying a selection of elements among a plurality of graphical and/or data entry elements, each element having at least a property among a plurality of graphical and/or activation and/or content properties; receiving and displaying formulas, each formula linking at least two properties of one element or several elements of said selection; determining from said selection of elements and said formulas a separate graphical interface program, the execution of said separate graphical interface program resulting in the display of said selection of elements, the properties of which are linked by said formulas, any change in the linked properties resulting in a re-evaluation of the formula.

According to one embodiment of the present invention, the general purpose data processor operates under the control of the stored program containing a set of instructions that, when executed, control the data processor to check the formulas for inconsistencies before the determination of said separate graphical interface program and of displaying an alert message when at least one inconsistency is determined.

According to one embodiment of the present invention, the general purpose data processor operates under the control of the stored program containing a set of instructions that, when executed, control the data processor to display an alert message when none of said formulas includes a specific property among the plurality of graphical and/or activation and/or content properties.

BRIEF DESCRIPTION OF THE FIGURES

The foregoing and other purposes, features, aspects and advantages of the invention will become apparent from the following detailed description of embodiments, given by way of illustration and not limitation with reference to the accompanying drawings, in which.

DETAILED DESCRIPTION

In the following description, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

It is desired to set out certain definition of terms used in this description and in the appended claims.

A source program is a computer program containing a sequence of statements and/or declarations written in some human-readable computer programming language.

A compiler is a computer program (or set of programs) that translates text written in a first computer language into a second computer language.

An interpreter is a computer program that executes, i.e. performs, instructions written in a programming language. An interpreter may be a program that either executes a source code program directly, or translates a source code program into some efficient intermediate code program and immediately executes this or is invoked to explicitly execute a stored precompiled program made by a compiler which is part of the interpreter system.

A virtual machine is a kind of interpreter. It is a software implementation of a machine (computer) that executes programs in the same way as a real machine. For example, the set of computer software programs called Java Virtual Machine is a virtual machine.

An intermediate code program is a binary representation of an executable program designed to be executed by an interpreter or a virtual machine or to be further compiled into a computer executable form. An example of an intermediate code is Java Bytecode. A program in Java Bytecode can be executed by the interpreter Java Virtual Machine.

An object program, or program in object code, is a computer program that is a representation of a source program in a computer executable form. For example, an object program can only contain machine code, which is code directly executed by the processor of a computer.

A scripting language, script language or extension language is a programming language that controls a software application. A "Script" is a sequence of instructions in a scripting language. A script cannot be executed independently from any other application. It is usually distinct from the core code of the associated application, which can be written in a different language. A script is usually accessible to a user and enables the behavior of the application to be adapted to the user's needs. A script can be directly interpreted or can be compiled to an intermediate code program which is interpreted. For example, JavaScript is a scripting language. A JavaScript engine is an interpreter that can interpret a JavaScript source code program. For example, a Web browser usually includes a JavaScript engine.

A graphical interface program is a program that, when executed on a computer, displays a graphical interface through which a user can make operations such as entering data, checking boxes, selecting items in pull-down menus, activating buttons, etc. The graphical interface can be used as a data entry tool, as a command interface of a numerically controlled machine, etc.

A graphical interface design program is a program that, when executed on a computer, provides to a designer tools to design a graphical interface program.

An element of a graphical interface is a graphical and/or interactive elementary part of the graphical interface. Examples of elements of a graphical interface are:

the main window of the graphical interface inside which the other elements of the graphical interface are displayed;
a check box;
a pull-down menu;
a work area or data entry field;
a button.

A property of an element is a graphical and/or activation and/or content feature or attribute of the element whose value can be set by the designer during the design of the graphical interface program and/or can be modified by a user during the execution of the graphical interface program. Most of the properties can be associated with several elements. Examples of such properties are:

the position of the element inside the main window or with respect to another element;

the fact that the element is or is not visible in the main window;

the fact that a user has activated the element or not. An activation of an element corresponds for example to the check of a box, to the writing in a data entry area, to the selection of an item in a pull-down menu, to the activation of a button, etc. In the following description, for the check box, this property is called property "Checked" and can correspond to a one-bit signal set to "1" when a user has checked the box and set to "0" when the user has not;

the fact that a user is allowed to activate the element (the element is said to be enabled) or not (the element is said to be disabled). In the latter case, the element can nevertheless be visible on the main window, possibly with a modified color, but a user cannot activate it. In the following description, this property is called property "Enabled" and can correspond to a one-bit signal set to "1" when a user is allowed to activate the element and set to "0" when a user is not;

generic properties relative to the name or designation of the element, such as the content of the name, the fact that the name is or is not displayed (visible) in the main window, the position of the name in the main window, the font or symbols used for displaying the name, etc. In the following description, the content of the name will be called property "Text".

Further examples of properties for the element "main window" are, for example, the dimensions of the main window and the background color and texture of the main window. Further properties for the element "pull-down menu" are, for example, the number of items of the pull-down menu and the content of each item of the pull-down menu. Further properties for the element "data entry box" are, for example, the form and dimensions of the data entry box and the content of the data entry box. In the following description, this property will be called property "Value". A further property for the element "button" is, for example, the fact that the button has or has not been activated by the user.

Referential transparency is a property of parts of computer programs. An expression is said to be referentially transparent if it can be replaced with its value without changing the program (in other words, yielding a program that has the same effects and output given the same input).

Referential opaqueness is the opposite of referential transparency.

Imperative programming is a programming paradigm that describes computation in terms of statements that change a program state. In much the same way that imperative mood, in natural languages, expresses commands to take action, imperative programs define sequences of commands for the computer to perform.

Functional programming is a programming paradigm that treats computation as the evaluation of mathematical functions, in contrast to the imperative programming style, which emphasizes changes in the state.

A spreadsheet is a computer application that simulates a paper, accounting worksheet. It displays multiple cells usually in a two-dimensional matrix or grid comprising rows and columns. Each cell contains alphanumeric text, numeric values or formulas. A formula defines how the content of that cell is to be calculated from the contents of any other cell (or combination of cells) each time any cell is updated.

A formula is an equation linking the value of a property of an element to the value of one or several properties of one or several elements. A formula can contain mathematical and/or logic operands linking the properties and can be written in a symbolic language. The formula in the present invention, are referentially transparent, as in spreadsheets or functional languages.

A computer algebra system (CAS) is a software program that facilitates symbolic mathematics. The core functionality of a CAS is manipulation of mathematical expressions in symbolic form, such as a formula. As an example, the computer program called Mathematica, sold by Wolfram Research, supports a computer algebra system.

Figure 1:
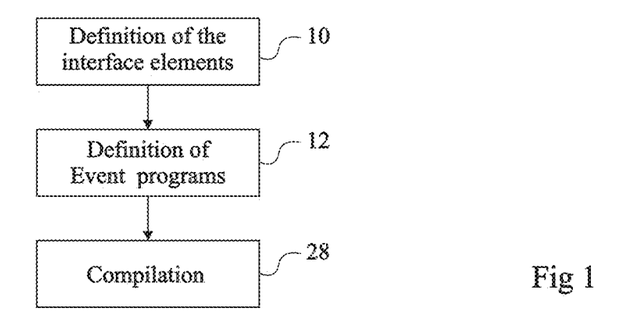
FIG. 1 is a flow chart showing an exemplary method for designing a graphical interface program in event programming.
Figure 2:
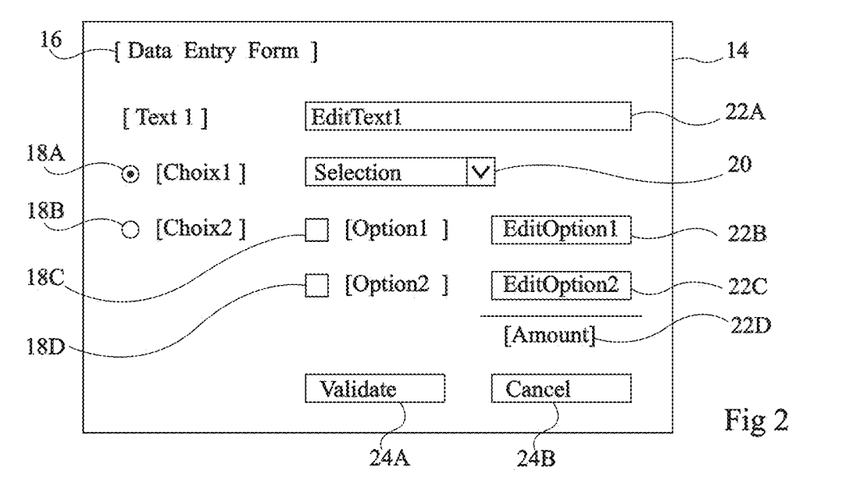
FIG. 2 is a display of an exemplary graphical interface.
Figure 3:
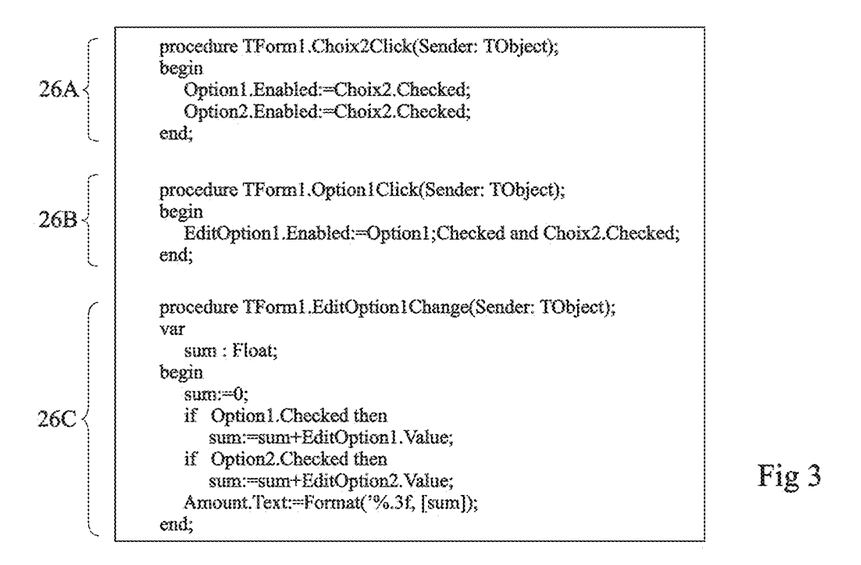
FIG. 3 is a display of exemplary event programs associated with the graphical interface of FIG. 2.

FIG. 1 is a flow chart showing a common method for designing a graphical interface program. FIG. 2 shows an example of a graphical interface and FIG. 3 shows an example of event programs.

At step 10, the graphical interface design program is launched on a computer. The program displays on the screen of the computer to the designer a library comprising the available elements. The designer can select the elements according to the graphical interface he wishes to design. The example graphical interface shown on FIG. 2 comprises a main window 14, the name of which 16 has the content "Data Entry Form", four check boxes 18A, 18B, 18C and 18D, including two round boxes and two square boxes, the names of which have the contents "Choix1", "Choix2", "Option1" and "Option2", a pull-down menu 20, the name of which has the content "Selection", four data entry areas 22A, 22B, 22C, 22D, the names of which have the contents "Text1", "EditOption1", "EditOption2" and "Amount" and two buttons 24A, 24B, the names of which have the contents "Validate" and "Cancel".

The designer sets, at that time, initial values of some properties of the elements. In the example of FIG. 2, the designer has set the dimensions and background color of main window 14 and the positions and contents of the names of the elements. The method continues at step 12.

At step 12, the graphical interface design program opens a window 25 in which the designer can write the event programs. Three examples of event programs 26A, 26B and 26C written in the Object Pascal language are shown. In these programs 26A, 26B, 26C, a property of an element is designated in the following format "name of the element". "name of the property". For example, the property "Option1.Enabled" corresponds to the generic property "Enabled" applied to element "Option1". First program 26A is called when the user modifies the value of the property "Checked" of the element "Choix2". It modifies the property "Enabled" of the elements "Option1" and "Option2". Second program 26B is called when the user modifies the value of the property "Checked" of the element "Option1". It sets to "1" the property "Enabled" of the element "EditOption1" only if the properties "Checked" of the elements "Option1" and "Choix1" are both set to "1". Third program 26C modifies the property "Text" of the element "Amount" according to the properties "Value" of the enabled element "EditOption1" or "EditOption2". The method continues at step 28.

At step 28, a compilation of the event programs and the general program of the graphical interface is made to provide a graphical interface program in a programming language which is more adapted to be interpreted or executed. The graphical interface program can be in a source code, such as Java, a scripting language, an intermediate code or an object code.

As explained above, such a method for designing a graphical interface has several drawbacks. In particular, from the examples previously described, it appears that the number of event programs to be written and the complexity thereof increase quickly as soon as the number of elements of the graphical interface increases. The writing of all the event programs quickly becomes difficult. Moreover, as soon as the number of event programs is important, it is practically impossible for the designer to search for the inconsistencies of the events programs. There is then a high risk that the resulting graphical interface program contains bugs. The referential opaqueness of the imperative programs used does not allow the compiler to check the consistency of the code.

Instead of writing events programs when designing the graphical interface program, an embodiment of the present invention provides the use of formulas linking properties of the elements of the graphical interface. As will be explained further, the use of formulas facilitates the work of the designer. Indeed, the inconsistencies of a set of formulas can easily be checked by a computer algebra system. Moreover, according to one embodiment of the present invention, the computer algebra system can give indications to the designer to improve the writing of the formulas.

Figure 4:
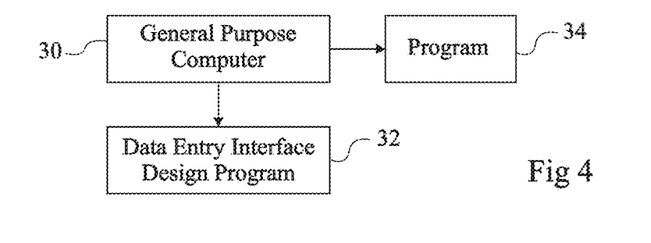
FIG. 4 is a simplified block diagram showing the interactions between a computer and a graphical interface design program during the design of a graphical interface program.

Referring to FIG. 4, a general purpose computer 30 is shown. It comprises input means, such as a keyboard, a mouse, etc, and display means such as a screen. A graphical interface program is designed through the execution of a graphical interface design program 32. The graphical interface design program 32 can be a program stored on computer 30. However, graphical interface design program 32 can also be executed on another computer linked to computer 30 through a network, for example the Internet. By the use of the graphical interface design program 32, a graphical interface source program is obtained including configuration parameters of the graphical interface and the associated formulas. The graphical interface design program 32 includes a computer algebra system and a compiler, which acts on the source program to produce a program 34 in a source code, such as Java, a scripting language, an intermediate code or an object code. The program 34 can be left in a storage area on the same computer on which the graphical interface design program 32 has been executed or can be sent to another computer on which it is to be executed. For example, program 34 can be written in JavaScript. Then, the program 34 can be interpreted by a web browser or any JavaScript engine.

Figure 5:
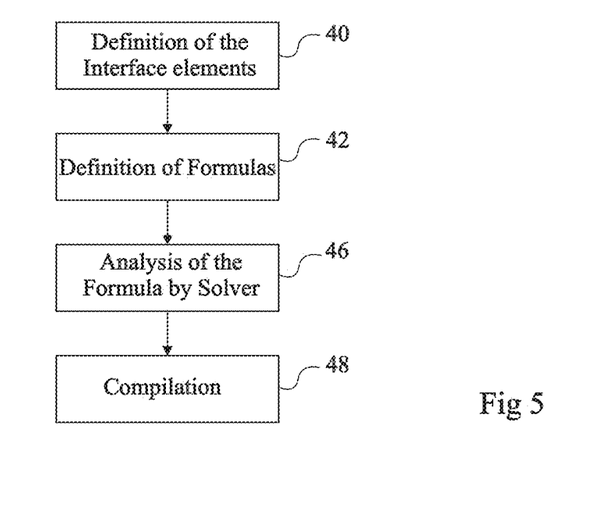
FIG. 5 is a flow chart showing a method for designing a graphical interface program according to an embodiment of this invention.
Figure 6:
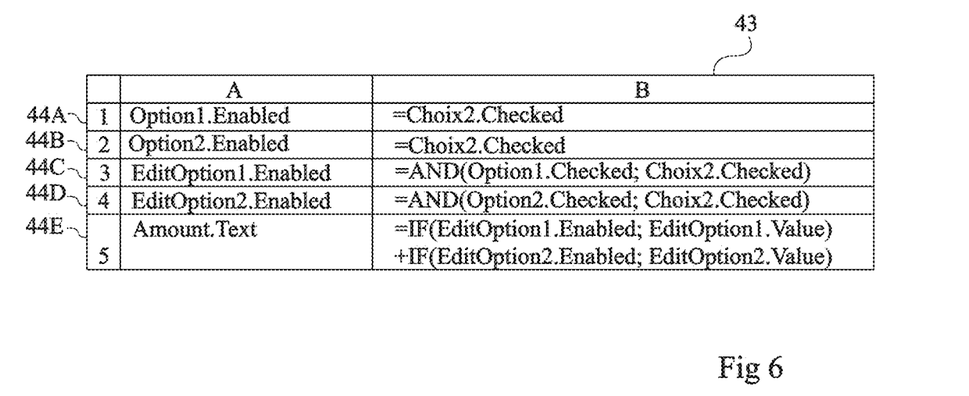
FIG. 6 is a display of exemplary formulas associated with the graphical interface of FIG. 2 and provided during the design of the graphical interface program according to one embodiment of the present invention.

FIG. 5 is a flow chart showing a method for designing a graphical interface program according to one embodiment of the present invention. FIG. 6 shows an example of formulas determined by a designer during the execution of one embodiment of the graphical interface design program 32.

At step 40, the graphical interface design program is launched. The program displays to the designer a library comprising the available elements. The designer can select the elements according to the graphical interface he wishes to design in the same way as explained for step 10 of the previously described method in relation to FIG. 1. For example, the graphical interface shown on FIG. 2 can be defined at step 40. At step 40, the designer can also define relations between the graphical interface and other programs. For example, when the graphical interface is used to command a numerically controlled machine, the designer can link the execution of instructions dedicated to the command of the machine to the activation of a specific button of the graphical interface.

At step 42, the graphical interface design program opens a window 43 wherein the designer can enter the formulas he wants to incorporate to the graphical interface program. Each formula comprises a first field, labelled "A", corresponding to a property of an element of the graphical interface and a second field, labelled "B", corresponding to another property of the same element or a property of another element or a mathematical and/or logic operation applied on other properties of the same element and/or properties of other elements. The formula can be understood as forcing, at any time, the value of the property in the first field of the formula to be equal to the value resulting from the operation made in the second field. For example, five formulas 44A to 44E are shown on FIG. 6. Formula 44A forces the value of the property "Enabled" of the element "Option1" to be equal, at any time, to the value of the property "Checked" of the element "Choix2". Formula 44B forces the value of the property "Enabled" of the element "Option2" to be equal, at any time, to the value of the property "Checked" of the element "Choix2". Formula 44C forces the value of the property "Enabled" of the element "EditOption1" to be equal, at any time, to the logic sum (logic operand AND) of the values of the property "Checked" of the elements "Option1" and "Choix2". Formula 44D forces the value of the property "Enabled" of the element "EditOption2" to be equal, at any time, to the logic sum (logic operand AND) of the values of the property "Checked" of the elements "Option2" and "Choix2". Formula 44E forces the value of the property "Text" of the element "Amount" to be equal, at any time, to the sum of the property "Value" of the element "EditOption1" (if the property "Enabled" of the element "EditOption1" is set to "1") and the property "Value" of the element "EditOption2" (if the property "Enabled" of the element "EditOption2" is set to "1"). For this formula, a logic operand labelled "IF" was used. However, the graphical interface design program could accept any other symbolic language.

The components can be placed in layers, properties of which can be defined by formulas as the components' property. The layers can be partially transparent in order for the user to see components from multiple layers in the same screen.

The formulas can be written completely by the designer through input means such as a keyboard. However, a semi-automatic way of defining the formulas can be used. For example, the designer could use a pointer controlled by a mouse, a touch pad, etc., to select an element of the displayed graphical interface. The graphical interface design program then displays the properties associated with the selected element and the designer can select the desired property. The mathematical and logic operands can be displayed in a library so that a selection of the operands can also be made using a pointer.

At step 46, an analysis of the formulas is executed by the computer algebra system of the graphical interface design program. Such an analysis includes a check for any inconsistencies in the formulas. According to one embodiment of the present invention, the computer algebra system also indicates to the designer if a specific property of an element of the graphical interface is not used in the formulas. For example, the designer, when selecting the element in the library of the graphical interface design program, can select the property or properties of this element for which a presence check should be made by the computer algebra system. According to a variation, the element properties for which a presence check in formulas is made by the computer algebra system can be preset. The computer algebra system can also indicate to the designer a property which is used in the formulas, but the value of which never changes when the other properties used in the formulas are modified. The graphical interface design program can indicate to the designer the properties for which an anomaly has been detected. The designer can then modify the formulas to correct the anomaly or instruct the graphical interface design program to disregard the anomaly. Compared to a general computer algebra system, the computer algebra system of the graphical interface design according to embodiments of the present invention can advantageously have a simpler structure since it is not required to offer as many functions as a general computer algebra system does. The method continues at step 48.

At step 48, a compilation of the source program of the graphical interface program is made to provide a graphical interface program in a source code, such as Java, a scripting language, an intermediate code or an object code.

Figure 7:
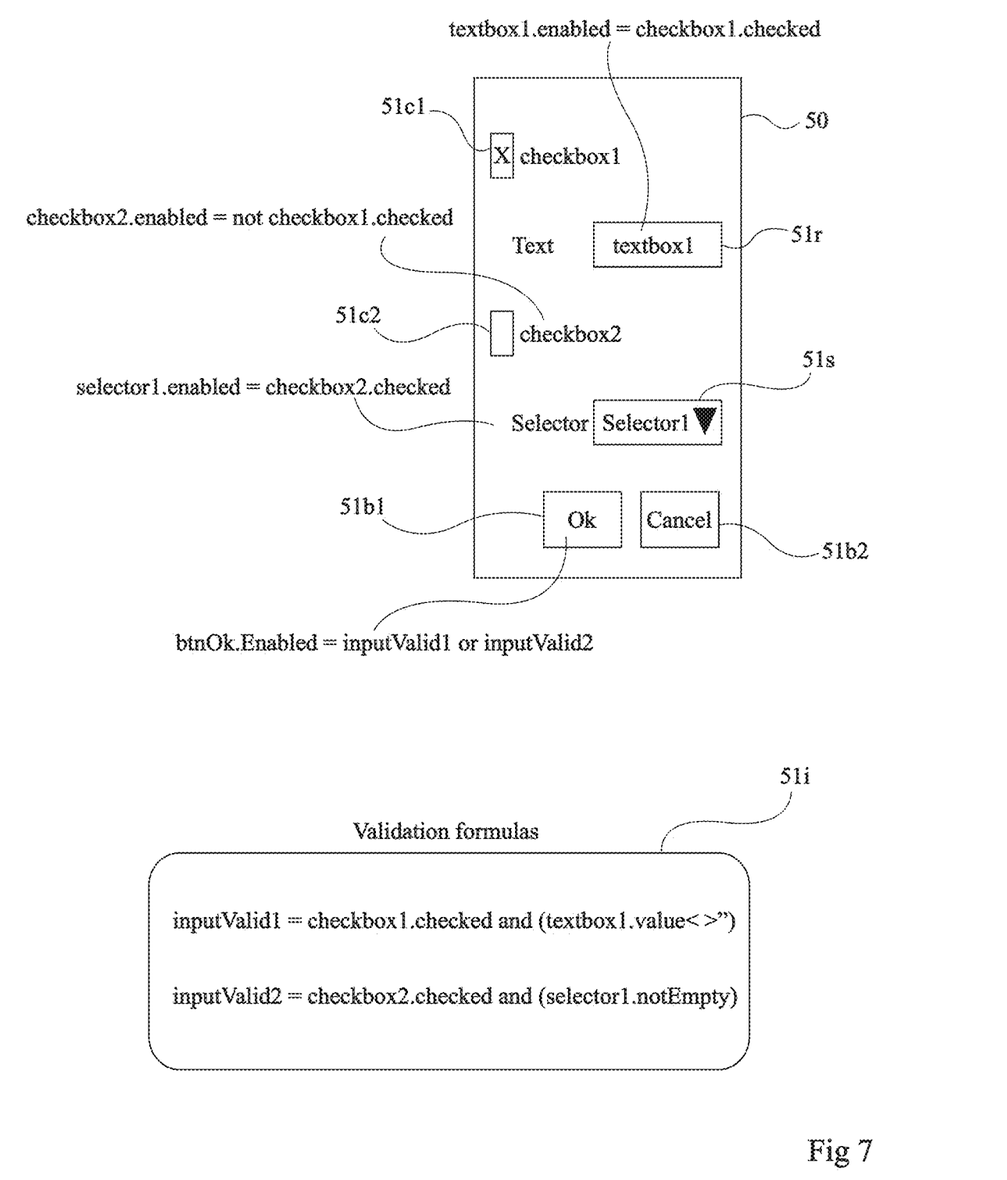
FIG. 7 illustrates an application example of activating a component.

FIG. 7 illustrates an application example of the disclosed embodiment for activating components. This figure represents a display layer 50 with visible elements 51$c$1 and 51$c$2 (check boxes), 51$t$ (text boxes), 51$s$ (selector), 51$b$1 and 51$b$2 (buttons) having properties (legends "checkbox1", "Text", "checkbox2", "Selector", "ok", "cancel"). In this example, four formulas (71: textbox1.enabled=checkbox1.checked; 72: checkbox2.enabled=not checkbox1.checked; 73: selector1.enabled=checkbox2.checked; btnOK.Enabled=inputValid1 or inputValid2) are associate to the elements 51$t$, 51$c$2, 51$s$ and 51$b$1. Other elements 51$i$ (not displayed once the program is compiled) may exist and correspond to intermediate computation. For example, validation formulas correspond to 75: inputValid1=checkbox1.checked and (textbox1.value<>" ") and 76: inputValid2=checkbox2.checked and (selector1.notEmpty).

According to a possible use, one can determine the sequence of actions to be taken in the event of an action by a user. As an example, upon activation of checkbox1, the activation states of textbox1 and checkbox2 change (formulas 71 and 72), as well as the activation state of the OK button (formula 75).

According to another possible use of the referential transparency, the application uses that fact that selector1 is active only if checkbox2 is ticked (formula 73), and that InputValid2 is true only if checkbox2 is active (ticked) and selector1 is not empty. As long as checkbox2 is not ticked, inputValid1 does not change (formulas 75 and 76). Further, checkbox2 is active only if checkbox1 is not ticked (formula 72). Hence, inputValid1 will not change as long as checlbox1 stays ticked.

According to another possible use, the formulas are used in error detection. Suppose that formula 73 has been redrafted as follows: selector1.enabled=checkbox1.checked and checkbox2.enabled. Using referential transparency can lead to the following formula "selector1.enabled=checkbox1.checked and (not checkbox1.checked), i.e. selector1.enabled would not become true. This could be used to detect such kind of incoherency.

Figure 8:
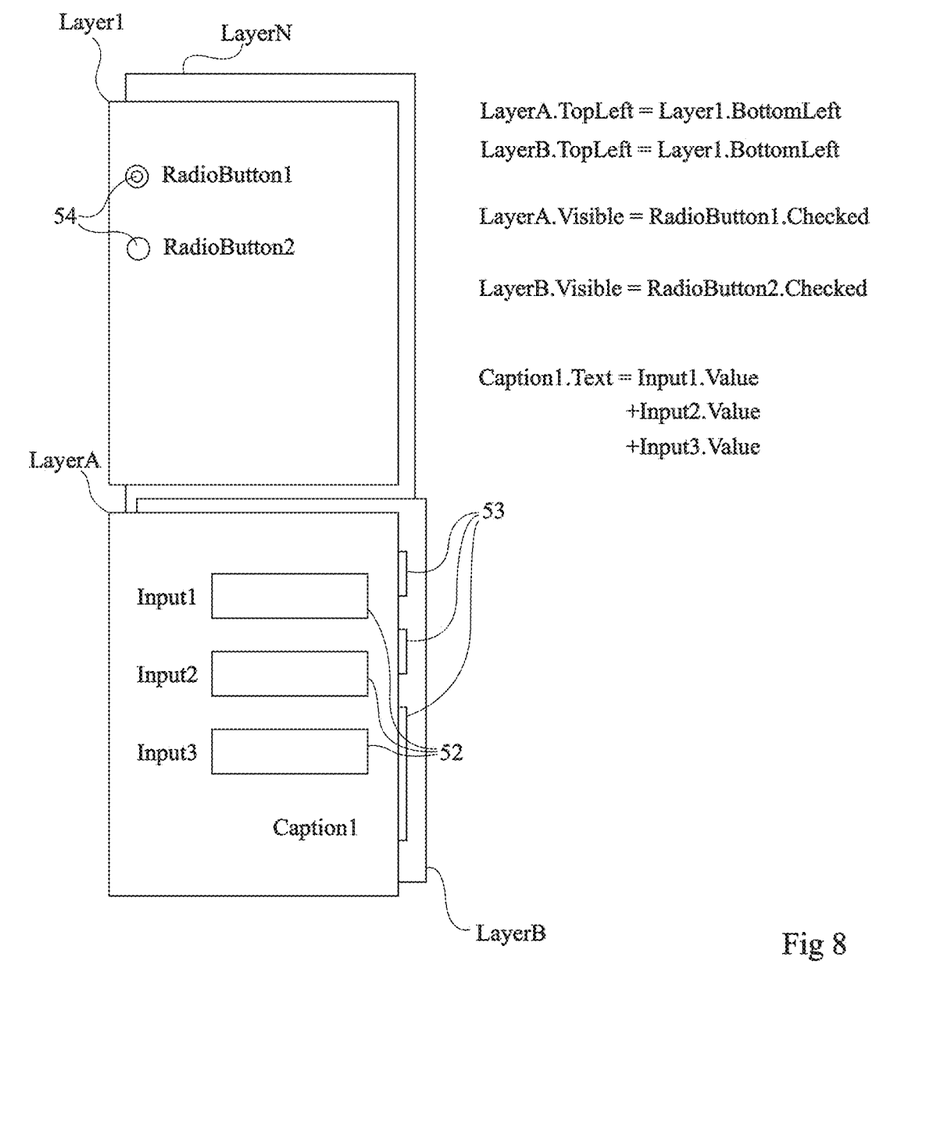
FIG. 8 illustrates another application example of activating components on multiple layers.

FIG. 8 illustrates an example of an application in a multilayer display. Formulas are used to define the location in the screen and/or the content of the layers (for example Layer1, LayerN, LayerA, LayerB. For example, LayerA contains input boxes 52, LayerB contains boxes 53, and layer1 contains selection buttons 54. Several implicit formulas determine the positions and visibility of the layers. For example: 81: LayerA.TopLeft=Layer1.BottomLeft, 82: LayerB.TopLeft=Layer1.BottomLeft, 83: LayerA.Visible=RadioButton1.Checked, 84: LayerB.Visible=RadioButton2.Checked, 85: Caption1.Text=Input1.Value+Input2.Value+Input3.Value.

For clarity, layers 1 and N, respectively A and B) are represented in perspective. In practice, only one level is visible depending on the results of the formulas.

The formulas can be used to define invariants. For example, formula 81 indicates that coordinates in the screen of the left corner at the top of layer A should be the same as those of the left corner at the bottom of Layer 1. An implementation would use this formula only if one of the Layers 1, A, and B is moved (formulas 81 and 82). In FIG. 8, elements of layer 1 are also used to control the visibility of layers A and B. The property of the buttons 54 is that only one of the buttons can be active (the buttons are mutually exclusive). Layers A and B can then not be simultaneously visible. If buttons 54 are replaced by check boxes, the conflict would be highlighted to the user.

FIG. 8 also illustrates an optimization according to which one takes benefit of the fact that, if layer A is not visible (i.e. if RadioButton1 is not active), by transitivity of the formulas, the input boxes as well as the result of Caption1 would then not be computed.

In the embodiments of FIGS. 7 and 8, the formulas are displayed only during the conception. Then, the graphical interface program is obtained by compilation. The graphical interface program is determined (compiled) from said selection of elements and said formulas.

It should be noted that the formulas are always verified during the execution of the interface program. In other words, the program ensures that the formulas are always respected during the execution. Any input of the user modifying an element with linked properties resulting in a re-evaluation of the formula and a possible update of the display of the linked element.

The previously described embodiment of the present invention advantageously allows the designer to avoid writing event programs. The writing of sets of instructions from the formulas is made by the computer algebra system and the conversion into a program in a source code, such as Java, a scripting language, an intermediate code or an object code is made by the compiler. An advantage is that, during the writing of the formulas, the designer does not need to refer to the features of the operating system or the visualization layer of the computer on which the graphical interface program will be executed. On the contrary, when event programs are written, it is often necessary, according to the programming language used, to refer to features of the computer on which the graphical interface program will be executed.

An interest of the previously described embodiment of the present invention is that the obtained graphical interface program is relatively concise when written in a language such as Javascript or HTML (Hyper Text Markup Language). Hence, the graphical interface program can easily be downloaded on a local computer. This is advantageous when the graphical interface program is stored on a first computer and a user wishes to execute the graphical interface program from a second computer linked to the first computer by a network, for example the Internet. In such a case, the graphical interface program can be easily downloaded on the second computer, which contributes to a faster use thereof.

Another interest of the previously described embodiment of the present invention is that the obtained graphical interface program is dedicated to the interface as conceived by a designer. Therefore, the execution of the graphical interface program is faster than what would be obtained by using an automatic program for event management.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method, implemented by a data processor by the execution of a program defined in functional programming, of generating a graphical interface program comprising:

receiving and displaying a selection of elements among a plurality of graphical and/or data entry elements, each element having at least a property among a plurality of graphical and/or activation and/or content properties;

displaying at least a window and receiving and displaying in said window referentially transparent formulas, each formula being an equation linking at least two properties of one element or several elements of said selection and comprising a least a mathematical and/or logic operator, said mathematical and/or logic operator being displayed in said window when said mathematical and/or logic operator is written by a designer on an input apparatus of the data processor or said mathematical and/or logic operator is displayed in a library and selected by the designer, the method further comprising a step of checking the referentially transparent formulas for inconsistencies using a computer algebra system before determining a separate graphical interface program, thereby preventing an inconsistency corresponding to the occurrence of a never-ending loop and an inconsistency corresponding to the occurrence of circular references when the graphical interface program is executed, the method further comprising the step of displaying an alert message when at least one inconsistency is determined; and determining from said selection of elements and said formulas the separate graphical interface program, the execution of said separate graphical interface program resulting in the display of said selection of elements, the properties of which are linked by said formulas, any input of a user modifying an element with linked properties resulting in a re-evaluation of the formula and a possible update of the display of the linked element.

2. The method of claim 1, wherein the program defined with the components can be recursively used as a component itself, the properties of which will be defined by formulas.

3. The method of claim 1, further comprising the step of displaying an alert message when none of said formulas includes a first property among the plurality of graphics and/or activation and/or content properties.

4. The method of claim 3, further comprising the step of displaying an alert message when a second property included in the formulas remains unchanged when the other properties of the formulas are modified.

5. The method of claim 4, wherein, for at least one formula among said formulas, at least one property of the at least two properties of said at least one formula is representative of whether or not, during the execution of said graphical interface program, the element associated with said at least one property is allowed to be activated.

6. The method of claim 5, wherein, for at least one formula among said formulas, at least one property of the at least two properties of said at least one formula is representative of whether or not, during the execution of said graphical interface program, the element associated with said at least one property was used.

7. The method of claim 6, wherein, for at least one formula among said formulas, at least one property of the at least two properties of said at least one formula is representative of whether or not, during the execution of said graphical interface program, the element associated with said at least one property is displayed.

8. A processor operating under control of a stored program containing a set of instructions that, when executed, control the processor to execute a program defined in functional programming to perform the following functions:

receiving and displaying a selection of elements among a plurality of graphical and/or data entry elements, each element having at least a property among a plurality of graphical and/or activation and/or content properties;

displaying at least a window and receiving and displaying in said window referentially transparent formulas, each formula being an equation linking at least two properties of one element or several elements of said selection and comprising a least a mathematical and/or logic operator, said mathematical and/or logic operator being displayed in said window when said mathematical and/or logic operator is written by a designer on an input apparatus of the processor or said mathematical and/or logic operator is displayed in a library and selected by the designer, the method further comprising a step of checking the referentially transparent formulas for inconsistencies using a computer algebra system before determining a separate graphical interface program, thereby preventing an inconsistency corresponding to the occurrence of a never-ending loop and an inconsistency corresponding to the occurrence of circular references when the graphical interface program is executed, the method further comprising the step of displaying an alert message when at least one inconsistency is determined; and determining from said selection of elements and said formulas the separate graphical interface program, the execution of said separate graphical interface program resulting in the display of said selection of elements, the properties of which are linked by said formulas, any input of a user modifying an element with linked properties resulting in a re-evaluation of the formula and a possible update of the display of the linked element.

9. The processor of claim 8, operating under the control of the stored program containing a set of instructions that, when executed, control the processor to display an alert message when none of said formulas includes a specific property among the plurality of graphical and/or activation and/or content properties.

\* \* \* \* \*

UNITED STATES PATENT AND TRADEMARK OFFICE
CERTIFICATE OF CORRECTION

PATENT NO. : 10,545,734 B2
APPLICATION NO. : 14/529298
DATED : January 28, 2020
INVENTOR(S) : Eric Grange et al.

It is certified that error appears in the above-identified patent and that said Letters Patent is hereby corrected as shown below:

On the Title Page

Item (71), Applicant city should read --Lyon (FR)--

Item (72), Inventor Grange city should read --Lyon (FR)--

Item (72), Inventor Rinaudo city should read --Lyon (FR)--

Item (73), Assignee city should read --Lyon (FR)--

Signed and Sealed this
Tenth Day of March, 2020

Andrei Iancu
*Director of the United States Patent and Trademark Office*